United States Patent Office 2,834,706
Patented May 13, 1958

2,834,706

METHOD OF KILLING MARINE BORERS

Clarence Oscar Fulton, Vernon, British Columbia, and Paul Chandos Trussell, Vancouver, British Columbia, Canada No Drawing. Application August 1, 1956
Serial No. 601,386

8 Claims. (Cl. 167—14)

This invention relates to a novel method of killing the adult forms of marine borers of the teredine type (Teredo and Bankia species), and to novel applications of the method for accomplishing this result.

This is a continuation-in-part of our application Serial Number 397,265, filed December 9, 1953, now abandoned.

The Teredinidae are a very highly specialized and unique biological family. They exist as free swimming organisms only in the larval stage. The larval form resembles a minute bivalved clam and for this reason Teredinidae are classified biologically with the *Mollusca phylum*. To survive, the larva must, within a limited period of time, attach itself to some submerged timber. Here metamorphosis to the adult form occurs. The adult form, which is unable to swim or move freely over the surface of wood, immediately burrows into the timber where it remains during its entire life span. As is grows, the adult enlarges its tunnel inside the timber to accommodate its body and some species commonly reach lengths as long as twenty-four inches and diameters as large as one half an inch. Established inside a timber, the adult teredine borer is unique in its ability to withstand efforts to dislodge or kill it. The timber itself acts as a natural shield against many destructive forces. Mechanical and electrical shock, percussional blasts and direct or indirect electrical charges have proven ineffectual in completely killing imbedded borers. In addition, the animal possesses an unusually distinctive protective mechanism against abnormal conditions, including dissolved poisons. Under normal conditions, the two siphons at the posterior end are the only portions of the imbedded animal which extend beyond the surface of the timber in which the teredine borer is imbedded. Through one of these siphons the animal draws in sea water containing dissolved oxygen and suspended food material and through the other it expels wastes. The adult Teredinidae possess a highly sensitive mechanism for detecting unfavourable conditions such as the presence of foreign chemicals which, if ingested, might prove poisonous. Once this perception has taken place, the borer immediately withdraws its siphons inside the burrow and plugs the narrow entrance with two appendages called pallets. Thus, sealed inside its burrow in this manner, the borer is practically immune against efforts to kill it, short of destroying the timber in which it is imbedded. Indeed, prior to this invention, no economic means was available for destroying teredine borers imbedded in wood.

Teredinidae are found in sea waters wherever submerged wood is present and have plagued mankind whenever he has placed wooden structures in the world's oceans. The economic destruction of wood is associated only with the tunnelling of the adult form. The size of the burrow corresponds to the size of the borer and the actual volume loss of timber. Since these tunnels are filled with live Teredo or Bankia (density of water), or water when the borers die, a considerable loss in buoyancy results from the infestation. Where infestation is heavy, the entire cross-section of timbers is honeycombed by teredine tunnels so that the timbers suffer almost complete loss of mechanical strength. In the sea-water transport and storage of lumber and pulp logs, tremendous economic losses occur through shrinkage in wood volume and the actual loss of whole logs which become waterlogged and sink due to borer tunnelling.

Heretofore, the only practical methods of combating Teredo or Bankia have been preventative in nature. These treatments prevent establishment on the timber by the larvae and prevent their metamorphosis to the adult form. Two general types of preservatives have been used to protect wood against marine-borer attack: chemicals coated on to the surface of the wood, and chemicals impregnated into wood. Chemical coatings range the gamut from the seal tar used by the Norse Vikings to the modern formulations based principally on coal distillation and copper salts. These preservatives have practical limitations. Probably most important, they are abraded off by mechanical contact or are leached off by the action of sea water. Even the most insoluble preservatives are leached away by the constant washing by sea water. Since any break in the protective coating is a potential point of entry for teredine larvae the protective coating must be renewed periodically. Should the wood become infested due to failure of the protective coating, the Teredo or Bankia can only be eliminated by removing the timber or wood from salt water long enough to kill the infesting animals by starvation or desiccation. These surface protective coatings for marine timbers are limited in their application because of their initial cost and their non-permanency. Such treatments are routinely used on wooden ships and boats. In many other instances the marine timbers have been "permanently" installed on the shore line or in some large floating structure and renewing the protective coating is not feasible.

The permanency of preventative treatments for protecting wood against teredine borers is enhanced by pressure-impregnation techniques. By such procedures the protective agent is literally forced into the air spaces of the wood for depths up to one inch. This creates essentially a protective coating in depth, which is much less susceptible to removal by abrasion or by leaching. The chief limitations of impregnating processes are the loss in buoyancy of the wood and the cost of processing. It is also of little value where considerable fitting of the wooden members of a marine installation must take place during construction. In such instances all members must be fitted and precut before impregnation, since any penetration of the protective layer during assembly provides points of entry for teredine larvae and the value of the treatment is lost. Notwithstanding the limitations of the foregoing processes, protective coatings are widely used on a variety of wooden boats or structures which can be removed from the sea water with facility for retreatment, and pressure impregnated timbers are widely used for a variety of permanent marine structures where loss of buoyancy is not a problem.

Many commercial situations exist where the use of available preventative treatments is not practical and where Teredo or Bankia do cause considerable economic damage. The following are some typical examples:

The method of construction and the buoyancy requirements of wooden drydocks prohibit the use of pressure impregnated timbers. Despite the large monetary resources of this industry no effective method of protecting drydock interiors against borer destruction has been found. Individual pontoons in a floating drydock range in value from one to five hundred thousand dollars. Continuous destruction of internal timber by marine borers necessitates continuous and costly maintenance. Oil treatments, steaming of dock interiors and the use of many toxic chemicals have failed to kill imbedded Bankia or Teredo.

In many locations whole logs or timbers strapped together serve as the base for many floating installations such as breakwaters, wharves, construction floats, floating logging camps and hospitals and a wide variety of marine structures. Pressure impregnation treatments cannot be used since maximum buoyancy is required. In some instances the site of the installation is so remote from the treating plant that treatment costs are prohibitive. The service life of these marine structures is limited by borer infestation. Until the present discovery no practical method was available for prolonging the life of such structures.

In maritime costal areas saw-logs and pulp-logs must remain immersed in sea water for long periods of time, either during transportation from logging sites to the mill or during storage near the mill. A typical example is along the coast of British Columbia, Canada. Here logs may be cut hundreds of miles from the mill site and are transported by salt-water tow, either in deep-sea rafts or flat rafts. In addition, enough logs are cut during the summer months to supply the mills for twelve months' operation. Consequently the logs are stored in sea water for months and severe losses by borers frequently ensure. A single deep-sea raft (80 feet wide, 20 feet deep and 400-500 feet long) can sustain damage exceeding exceeding ten thousand dollars. Along the coast of British Columbia, the annual loss due to marine-borer damage of logs is estimated to exceed five hundred thousand dollars. It is uneconomic to treat every log with a protective coating or paint since only those logs which are in sea water for long periods of time sustain economic damage and these logs cannot be predetermined. In addition, presently available chemical coatings applied to pulp logs would interfere with pulp manufacture. What has been required is a means of killing the adult Teredo or Bankia in infested logs before the animals grow sufficiently to cause excessive damage. The only effective method heretofore has been to tow infested logs into fresh water and store them there till the teredine borers have been killed by the low salinity. Not only are such procedures time consuming and uneconomical but facilities are frequently unavailable.

The inventive concept herein is the discovery of a poison which is not detected or sensed by the adult Teredo or Bankia over a wide range of concentrations. Consequently, when this poison is introduced into the water surrounding the wood in which the Teredinidae are imbedded, they do not plug their burrows, but continue to pump water in which the poison is dissolved through their bodies and are killed. The inventive concept is not the discovery of a poison but the discovery of one which is not sensed by the borers and which they ingest in killing quantities. It has been discovered that the poisons, the water-soluble alkali arsenites, namely ammonium, sodium and potassium arsenites, when dissolved in water surrounding adult teredine borers over the range in concentrations 0.000625% (6.25 parts per million by weight, p. p. m.) to 2% (20,000 p. p. m.) (calculated as arsenic trioxide) are not detected by the borers and consequently destroy them.

The inventors have tested the behaviour of adult teredine borers imbedded in wood towards a large number of poisons. A few typical examples are cited in the following table. Wooden test blocks containing imbedded live borers were immersed in solutions of the poisons in sea water. Those poisons which had a limited solubility were dissolved first in a suitable organic solvent and then dispersed in sea water. Withdrawal of borer siphons inside the wood indicated that the borers sensed the toxicant. After 18 hours the test blocks were removed from the poison solutions, rinsed and placed in untreated sea water. If the borers were still alive the siphons reappeared within half an hour.

The following table illustrates the different types of poisons which adult teredine borers can sense and protect themselves from by sealing themselves inside their burrows.

| Chemical | Concentrations Tested, p. p. m. | Sensed by Borers | Kill after 18 hours' exposure |
|---|---|---|---|
| Copper sulfate | 60-200 | yes | none. |
| Copper arsenite | 60-200 | yes | Do. |
| Mercuric chloride | 60-200 | yes | Do. |
| Mercuric arsenate | 60-200 | yes | Do. |
| Sodium arsenate | 60-200 | yes | Do. |
| Potassium permanganate | 60-200 | yes | Do. |
| Sodium fluoride | 60-200 | yes | Do. |
| Copper-8-quinolinolate | 60-200 | yes | Do. |
| Copper naphthenate | 60-200 | yes | Do. |
| Phenol | 60-200 | yes | Do. |
| Pentachlorophenol | 60-200 | yes | Do. |
| Dinitro-o-cresol | 60-200 | yes | Do. |
| 9-Fluorenone | 60-200 | yes | Do. |
| Phenylarsonic acid | 60-200 | yes | Do. |
| Phenylmercuric acid | 60-200 | yes | Do. |
| Chlordane (1,2,4,5,6,7,8,8-octachloro-2,3,3a,4,7a-hexahydro-4,7-methanoindene). | 60-200 | yes | Do. |
| Gamma isomer of benzene hexachloride. | 60-200 | yes | Do. |
| DDT(1,1,1-trichloro-2,2-bis (p-chlorophenyl) ethane). | 60-200 | yes | Do. |
| Rotenone | 60-200 | yes | Do. |
| Strychnine | 60-200 | yes | Do. |
| Sodium arsenite | 12.5-10,000 | no | Complete. |

General protoplasmic poisons, which are lethal to a wide variety of living organisms, are detected by the Teredinidae. These include inorganic poisons such as mercuric chloride, mercuric arsenite, sodium arsenate, potassium permanganate, sodium fluoride; metallo-organic poisons such as phenylarsonic and phenylmercuric acids and organic poisons such as strychnine. Other well known poisons like chlordane, DDT, and rotenone, which possess high insecticide activity are sensed by teredine borers. Even plant poisons, such as the soil sterilant, the gamma isomer of benzene hexachloride, is recognized and excluded from the teredine burrow. Various copper salts, copper sulfate, copper arsenite, copper-8-quinolinolate and copper naphthenate, which are extensively used as wood preservatives, even for preventing the entry of teredine larvae into wood, have no detrimental effect on the adult borer inside the timber. Derivatives of coal tar, such as phenol, dinitro-o-cresol and 9-fluorenone, which may be considered to represent the active fractions of cresosote used by the wood impregnating industry, do not adversely affect the adult teredine borer inside wood. These above examples represent only some of the better known poisons tested by the inventors in their search for one which the adult teredine borer could not detect and from which it could not protect itself.

Certainly the prior art does not suggest the present disclosure, namely, that adult teredine borers imbedded in wood would be unable to sense the poisons, sodium, potassium and ammonium arsenites. These water-soluble alkali arsenites, when dissolved in water are not detected by Teredo or Bankia over the extremely wide range of concentrations (calculated as arsenic trioxide) from as low as one part by weight in 160,000 parts of water to as high as 1 part in 50. The complete inability of teredine borers to detect these poisons over the above range of concentrations is extremely desirable, since the poisons may be introduced initially into the waters surrounding infested timbers at much higher concentrations than that finally required to kill the borers.

An inverse relationship exists between the concentration of the water-soluble alkali arsenite in the water surrounding the infested wood and the time required to kill the imbedded borers. For example, increasing the concentration of sodium arsenite (calculated as arsenic trioxide) from 25 p. p. m. to 50 p. p. m. of water reduces the exposure time required to kill an adult Teredo or Bankia imbedded in wood from twelve to six hours. The exposure times required to kill adult teredine borers at different concentrations of sodium arsenite (calculated as arsenic trioxide) are shown in the following table:

| Concentration of Sodium Arsenite (as arsenic trioxide), p. p. m. | Minimum Lethal Exposure Period |
|---|---|
| 1,000 | 10 min. |
| 200 | 90 min. |
| 100 | 3 hrs. |
| 50 | 6 hrs. |
| 25 | 12 hrs. |
| 12.5 | 18 hrs. |

Thus, the treatment time necessary to kill adult teredine borers imbedded in wood can be controlled within certain time limits by adjusting the concentration of sodium arsenite in the water surrounding the infested wood. Where time is relatively unimportant long exposure periods at low concentrations of sodium, potassium or ammonium arsenites are more economical. Since these compounds are non-specific poisons and teredine larvae have no special protective mechanisms as have the adults imbedded in wood, treatments at these concentrations destroy both the teredo adults and larvae.

Sodium arsenite is preferred in this process because it is readily available commercially, but ammonium arsenite and potassium arsenite function in the same manner in substantially the same proportion.

Other inventive concepts are methods of killing adult teredine borers imbedded in wood by introducing sodium, potassium or ammonium arsenite into the water surrounding the infested wood. Tremendous numbers of logs are moved in huge deep-sea bundle rafts. A method of treating this type of raft involves applying a concentrated solution of ammonium, sodium or potassium arsenite in water over the logs of the raft above the surface of the sea water. Since even low concentrations of a chemical of the order of one part chemical in 40,000 parts of water (25 p. p. m.) are denser than untreated water, solutions of the arsenite seep down from the point of application to the submerged logs. As these solutions sink they are admixed with the sea water surrounding the logs and diffuse laterally throughout the raft. The method of treatment has the advantage that it need only be applied if the raft becomes infested. This depends on the breeding habits of the Teredinidae in the waters through which the raft must pass or in which it is stored. Normally, treatment every two to three months during the breeding season kills all Teredinidae before they do any economic damage. This method has been applied to commercial deep-sea bundle rafts and complete kills of marine borers in infested logs in the raft have been obtained.

A method of treating flat rafts of logs comprises placing the raft in a bath containing a solution of sodium, potassium or ammonium arsenite in water. One procedure for applying this method is to construct a shallow pond near the high tide level in a short area with a slight slope. At high tide the raft is towed over the pond and as the tide recedes the raft of logs is left floating in this shallow bath. The arsenite chemical solution is sprayed over the logs and left until the next high tide. Thus, the toxicant is in contact with the logs infested with borers for the period of time between tides, namely, six to ten hours. All that is required to effect a complete kill of the teredine borers infesting the logs is to make the solution of the chemical in the bath strong enough to kill the borers within the time available. In practice, 60 p. p. m. of sodium arsenite, expressed as arsenic trioxide, has been found adequate.

In the operation of floating wooden dry docks the docks are raised or lowered by pumping out or admitting water to the pontoons of the dock. In practice the pontoons are never pumped completely dry and the interior of the pontoons inevitably becomes infested with teredine borers. A method for destroying the adult teredine borers imbedded in the interior timbers of a drydock pontoon or similar structures is to pump water-soluble alkali arsenite and water into the pontoons. The pontoons are filled with arsenite-water solution to a depth slightly greater than the highest point of borer infestation. Depending on its concentration, the chemical solution is allowed to remain inside the pontoon for a period of one to five days. This will kill all the borers and larvae in or on the wood of the pontoons.

The following table illustrates the application of this invention for killing marine borers in commercial wooden drydocks:

| Dry Dock | Location | Capacity of dry dock (tons) | Concentration [1] of arsenite, p. p. m. (calculated) | Time required for complete kill (hr.) |
|---|---|---|---|---|
| 1 | Vancouver, B. C. | 15,000 | 50 | 120 |
| 2 | Seattle, Wash. | 15,000 | 50 | 68 |
| 3 | do | 16,000 | 50 | 18 |
| 4 | Galveston, Tex. | 10,000 | 50 | 24 |
| 5 | Seattle, Wash. | 20,000 | 50 | 24 |
| 6 | do | 10,500 | 50 | 24 |

[1] Arsenite added as sodium arsenite and concentration expressed as p. p. m. arsenic trioxide.

Treatment of the drydock pontoons in the above examples with the chemical solution of sodium arsenite resulted in complete elimination of live teredine borers imbedded in the interior timbers for the first time in the history of these drydocks. The visual inspections were made by officers of the drydock companies some time after the arsenite treatment. Inasmuch as the water in the pontoons has been refreshed many times in the intervals, ample opportunity was afforded for any adult borers which had retracted inside the timbers and survived the treatment, to reappear and become active again. The treatment had been completely effective in solving the borer problem that had confronted these companies for as long as twenty-five years.

The use of this method for killing adult teredine borers imbedded in the timbers of drydock interiors is being accepted by an increasing number of drydock operators: nine drydocks along the Pacific Coast of Canada and the United States and in the Gulf of Mexico are being maintained free of borer damage by periodical treatment with a solution of one part of sodium arsenite in 20,000 parts of water (expressed as arsenic trioxide). One operator estimates that the savings to his organization over a ten-year period will approach one and a half million dollars.

The above examples demonstrate that a poison has been discovered which cannot be detected by adult teredine borers imbedded in wood. Furthermore, novel methods have been developed for the application of this poison to the waters surrounding the timbers infested with these borers and for destroying said borers in log rafts and structures which are exposed to sea water over long periods of time.

What we claim as our invention is:

1. The method of killing adult forms of teredine marine borers that exist during their entire adult stage in burrows in wood in sea water and have siphons normally projecting from the wood into the sea water by means of which they detect normally-accepted poisons, comprising the application to the sea water surrounding the infested wood of a solution of a water-soluble alkali arsenite selected from the group comprising sodium, potassium and ammonium arsenites, the arsenite being dissolved in water so that the water-soluble arsenite is sucked into the body of the borer, the solution ranging in concentration from 0.000625% to 2% arsenite (calculated as arsenic trioxide) by weight of water, whereby said borers, being unable to detect the solution over these concentrations, are killed as they draw the sea water containing the solution in through their siphons.

2. The method of killing adult forms of teredine marine borers that exist during their entire adult stage in burrows in wood in sea water and have siphons normally projecting from the wood into the sea water by means of which they detect normally-accepted poisons, comprising the application to the sea water surrounding the infested wood of a solution of sodium arsenite dissolved in water so that the arsenite solution is sucked into the body of the borer, the solution ranging in concentrations from 0.000625% to 2% arsenite (calculated as arsenic trioxide) by weight of water, whereby said borers, being unable to detect the solution over these concentrations, are killed as they draw the sea water containing the solution in through their siphons.

3. The method of killing adult forms of teredine marine borers that exist during their entire adult stage in burrows in wood in sea water and have siphons normally projecting from the wood into the sea water by means of which they detect normally-accepted poisons, comprising the application to the sea water surrounding the infected wood of a solution of ammonium arsenite dissolved in water so that the arsenite solution is sucked into the body of the borer, the solution ranging in concentrations from 0.000625% to 2% arsenite (calculated as arsenic trioxide) by weight of water, whereby said borers, being unable to detect the solution over these concentrations, are killed as they draw the sea water containing the solution in through their siphons.

4. The method of killing adult forms of teredine marine borers that exist during their entire adult stage in burrows in wood in sea water and have siphons normally projecting from the wood into the sea water by means of which they detect normally-accepted poisons, comprising the application to the sea water surrounding the infested wood of a solution of potassium arsenite dissolved in water so that the arsenite solution is sucked into the body of the borer, the solution ranging in concentrations from 0.000625% to 2% arsenite (calculated as arsenic trioxide) by weight of water, whereby said borers, being unable to detect the solution over these concentrations, are killed as they draw the sea water containing the solution in through their siphons.

5. The method of treating wood exposed to sea water to kill adult forms of teredine marine borers that exist during their entire adult stage in burrows in wood and have siphons normally projecting from the wood into the sea water by means of which they detect normally-accepted poisons, comprising adding a water-soluble alkali arsenite selected from the group comprising sodium, potassium and ammonium arsenites to the water coming into contact with the wood to form a solution which is not detected by the borers in the wood and is sucked in by them, the solution ranging in concentrations from 0.000625% to 2% arsenite (calculated as arsenic trioxide) by weight of water, said borers being unable to detect the solution over these concentrations are killed as they draw the sea water containing the solution in through their siphons.

6. The method of treating wood as claimed in claim 5 in which the arsenite of the solution is sodium arsenite.

7. The method of treating wood as claimed in claim 5 in which the arsenite of the solution is ammonium arsenite.

8. The method of treating wood as claimed in claim 5 in which the arsenite of the solution is potassium arsenite.

References Cited in the file of this patent

UNITED STATES PATENTS

| | | |
|---|---|---|
| 579,101 | Valleen | Mar. 16, 1897 |
| 2,434,291 | Smith | Jan. 13, 1948 |
| 2,573,252 | Farber | Oct. 30, 1951 |
| 2,590,162 | Ettel | Mar. 25, 1952 |

OTHER REFERENCES

Lindgren: Am. Lumberman, June 13, 1931 (2 pp.).

Buxton: Trans. Roy. Soc. Trop. Med. and Hyg., vol. 16, 1922–23, pp. 162–166.

Hackh's Chem. Dict., 3rd ed., 1944, p. 354.